United States Patent Office 3,467,643
Patented Sept. 16, 1969

3,467,643
DISAZO DYESTUFFS
Walter Horstmann, Cologne-Buchheim, and Edgar Siegel, Leverkusen, Germany, assignors to Farbenfabriken Bayer Aktiengesellschaft, Leverkusen, Germany, a corporation of Germany
No Drawing. Filed July 19, 1966, Ser. No. 566,210
Claims priority, application Germany, Jan. 14, 1966, F 48,167
Int. Cl. C09b *31/14, 33/12*
U.S. Cl. 260—160
10 Claims

ABSTRACT OF THE DISCLOSURE

Azo dyestuffs which are free from sulphonic acid groups and which correspond to the formula:

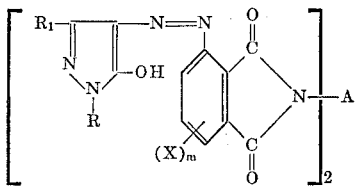

in which R denotes a member selected from the class consisting of hydrogen, identical or different alkyl, aralkyl, carbocyclic and heterocyclic radicals; $R_1$ stands for radicals selected from the group consisting of alkyl, aryl, carbalkoxy and carbonamido groups; X stands for substituents; m stands for an integer from 0 to 3; and A represents a member taken from the class consisting of aliphatic, carbocyclic and heterocyclic radicals.

The object of the present invention is to provide valuable new azo dyestuffs which are free from sulphonic acid groups and correspond to the general formula

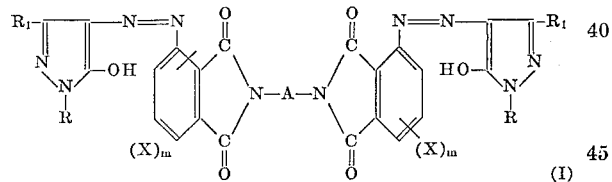

in which R denotes hydrogen or identical or different, optionally substituted alkyl, aralkyl, carbocyclic or heterocyclic radicals, $R_1$ represents alkyl, aryl, carbalkoxy and carbamido radicals, the radicals X are identical or different substituents, m stands for integers from 0 to 3, and A is an aliphatic, araliphatic, carbocyclic or heterocyclic radical; the dyestuffs are free from sulphonic acid groups; the above-mentioned alkyl, aryl, carbamido, aliphatic, araliphatic, carbocyclic and heterocyclic radicals, however, may contain non-ionic substituents.

The radicals R can be mono- or polynuclear; radicals of the benzene and naphthalene series are preferred. The following radicals may be mentioned in this context, for example: phenyl-; 2- or 3- or 4-methylphenyl-1; 2- or 3- or 4-chlorophenyl-1, 2- or 3- or 4-methoxy-phenyl-1; 3-nitrophenyl - 1; 3 - sulphonamidophenyl - 1; 2-methyl-4-chlorophenyl-1; 2,4-dimethylphenyl-1 and naphthyl-1 or -2; 2,6-dichloro- or -dimethyl- or 2-chloro-6-methylphenyl-1.

Suitable substituents X are, for example; lower alkyl substituents, such as methyl and ethyl; chloro and nitro substituents; lower alkoxy substituents, such as methoxy and ethoxy; fluoro, bromo, methylsulphonyl, ethylsulphonyl, phenylsulphonyl, trifluoromethyl substituents; and carbalkoxy substituents, such as carbomethoxy and carbethoxy.

Preferred alkyl radicals R and $R_1$ are lower alkyl radicals with 1–4 carbon atoms, which may be substituted.

The following radicals A can be used, for example:

(1) Aliphatic radicals which may be interrupted by hetero atoms or optionally substituted aromatic radicals (the latter are also mentioned as araliphatic radicals), such as

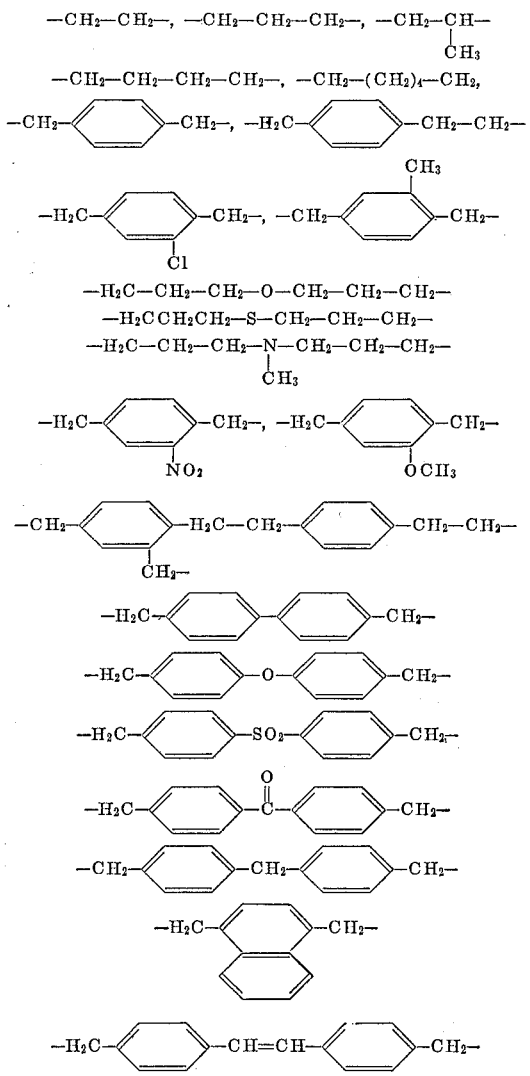

(2) Carbocyclic (saturated or unsaturated) radicals which in the case of polynuclear radicals may also be interrupted by heterocyclic radicals or may contain fused heterocyclic radicals, such as

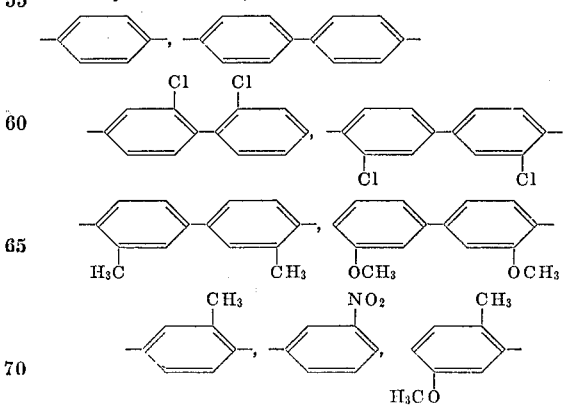

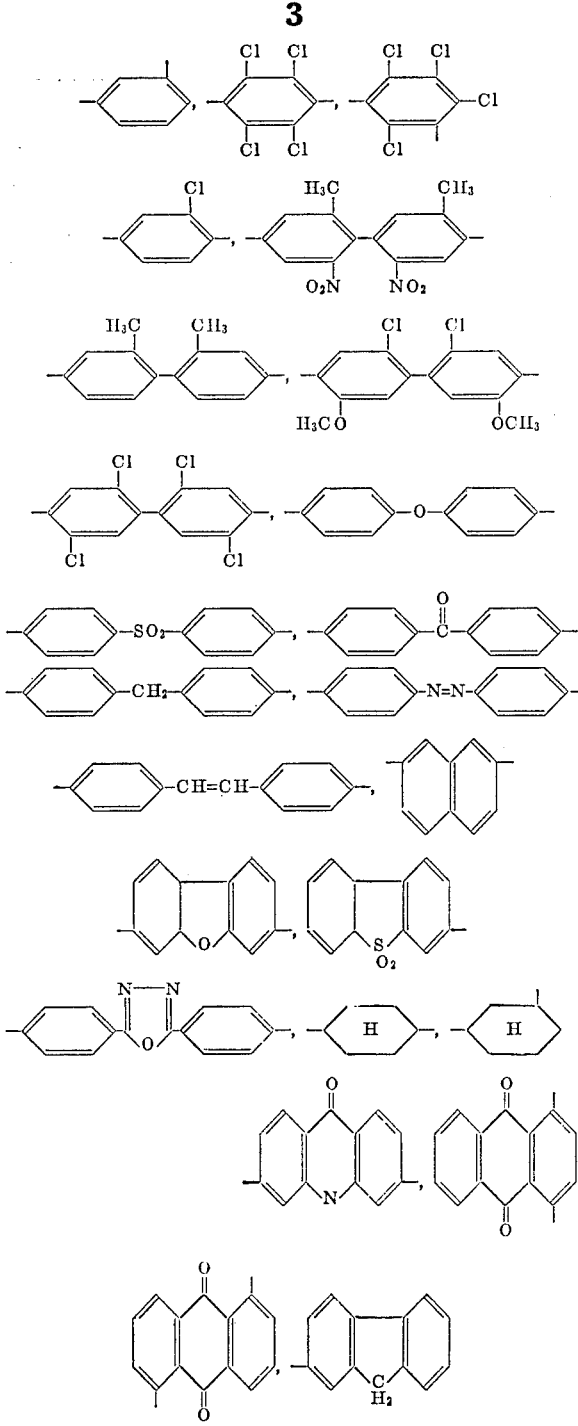

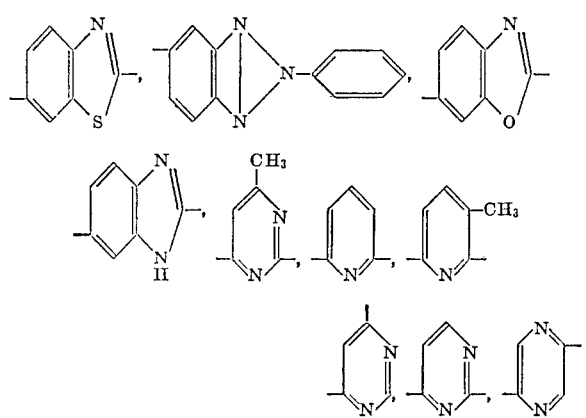

(3) Heterocyclic radicals, such as

A group of especially valuable dyestuffs in the range of the products of the Formula I corresponds to the formula

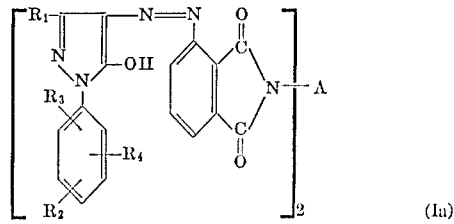

(Ia)

in which $R_1$ stands for methyl, carbomethoxy or carbethoxy substituents, $R_2$ for hydrogen, or for methyl, nitro, chloro, methoxy, ethoxy, sulphonamido substituents, $R_3$ for hydrogen or for methyl, chloro, methoxy substituents, $R_4$ for hydrogen or a chloro substituent, and A for an aliphatic, araliphatic, carbocyclic or heterocyclic radical; the dyestuffs are free from sulphonic acid groups.

The new azo dyestuffs (I) and (Ia) are obtained, when azo compounds of the formula

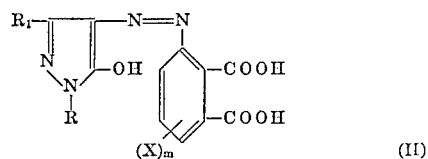

(II)

or

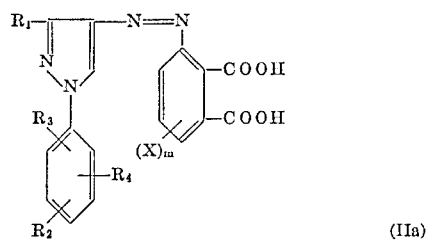

(IIa)

in which R, $R_1$, $R_2$, $R_3$, $R_4$, X and $m$ have the same meaning as above, or functional derivatives of these azo-dicarboxylic acids, especially the mono- or diesters, mono- or diamides, dicarbonimides or anhydrides, are reacted with diamines of the general formula

in which A has the same meaning as above, in a molar ratio of components (II) or (IIa) to component (III) of approximately 2:1, in the presence of acidic condensation agents, the components being so chosen that the final dyestuffs are free from sulphonic acid groups.

The reaction of the starting components is preferably carried out in a high-boiling organic solvent or solvent mixture, and the components can also serve as organic solvents. The condensation takes place at an elevated temperature, generally in the range from 80 to 240° C., preferably between 130° C. and 180° C.

The monoazo compounds of the general Formula II and IIa are prepared in the usual manner by diazotising optionally substituted 3-amino-phthalic acids or their functional derivatives and coupling with suitable pyrazolones, the components being free from sulphonic acid groups.

The following diazo components can be used, for example, for the preparation of the azo compounds (II) and (IIa): 3-amino-phthalic acid; 3-amino-phthalic acid-mono- and diesters such as 3-amino-phthalic acid monomethyl ester-(1) or 3-amino-phthalic acid dimethyl ester; 3-aminophthalimide; 3-amino-6-methyl-phthalic acid; 3-amino-5-methyl-phthalic acid; 3-amino-4-methyl-phthalic acid; 3 - amino - 5-nitro-phthalic acid; 3-amino-6-nitro-phthalic acid; 3-amino-5-methoxy-phthalic acid; 3-amino-6-methoxy-phthalic acid; 3-amino-6-chloro-phthalic acid; 3-amino - 4-methoxy-phthalic acid; 3-amino-6-bromo-phthalic acid; 3-amino-6-fluoro-phthalic acid; 3-amino-5,6-dimethoxy-phthalic acid; 3-amino-4,5,6-trimethoxy-phthalic acid; 3-amino-5,6-methylene-dioxy-phthalic acid;

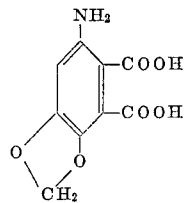

3 - amino - 5 - cyano - phthalic acid; 3 - amino - 6 - cyano-phthalic acid; 3-amino-5-methoxy-6-ethoxy-phthalic acid; 3 - amino - 6 - methyl-sulphonyl-phthalic acid; 3-amino-6-trifluoromethyl-phthalic acid; 3-amino-5-carbethoxy-phthalic acid; 3-amino-6-carbethoxy-phthalic acid.

The following pyrazolone coupling components can be used, for example, for synthetising the monoazo compounds (II) and (IIa); 3-methyl-pyrazolone-(5); pyrazolone-(5)-carboxylic acid-(3)-ethyl ester; 1,3-dimethyl-pyrazolone-(5); 1-benzyl-3-methyl-pyrazolone-(5); 1-(2'-benzothiazolyl) - 3 - methyl-pyrazolone-(5); 1-[β-(carb-aminophenyl)-hydroxyethyl]-3-methyl-pyrazolone-(5) of the formula

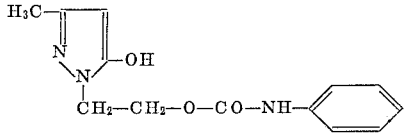

1-(β-benzoylamino-ethyl)-3-methyl-pyrazolone-(5);
1-(4'-chloro-phenyl)-3-methyl-pyrazolone-(5);
1-(4'-methylphenyl)-3-methyl-pyrazolone-(5);
1-(3'-nitrophenyl)-3-methyl-pyrazolone-(5);
1-(3'-sulphonamidophenyl)-3-methyl-pyrazolone-(5);
1-phenyl-3-methyl-pyrazolone-(5);
3-methyl-pyrazolone-(5);
1-(2'-chlorophenyl-)-3-methyl-pyrazolone-(5);
1-(3'-chlorophenyl-)-3-methyl-pyrazolone-(5);
1-(2',5'-dichlorophenyl)-3-methyl-pyrazolone-(5);
1-(4'-nitro-phenyl)-3-methyl-pyrazolone-(5);
1-(3'-carbomethoxyphenyl)-3-methyl-pyrazolone-(5);
1-phenyl-pyrazolone-(5)-carboxylic acid-(3)-anilide;
1-phenyl-pyrazolone-(5)-carboxylic acid-(3)-ethyl ester;
1-phenyl-pyrazolone-(5)-carboxylic acid-(3)-amide;
1-(3'-nitrophenyl-)-pyrazolone-(5)-carboxylic acid-(3)-ethyl ester;
1-(4'-nitrophenyl-)-pyrazolone-(5)-carboxylic acid-(3)-ethyl ester;
1-phenyl-pyrazolone-(5)-carboxylic acid-(3)-methyl ester The following aliphatic, araliphatic, carbocyclic and heterocyclic diamines are used, for example, for the condensation of the monoazo compounds (II) or (IIa) with the diamines (III), which is carried out according to the invention in high-boiling organic solvents with the addition of acidic condensation agents:

1,2-diamino-ethane;
1,4-diamino-butane;
1,6-diamino-hexane;
1,4-di-(aminomethyl)-benzene;
N,N-bis-(3-amino-n-propyl)-methylamine;
3,3'-diamino-n-propyl ether;
1,4-diamino-benzene;
1,4-diamino-2-chloro-benzene;
1,4-diamino-3-methyl-benzene;
1,4-diamino-2,5-dimethyl-benzene;
1,4-diamino-2-nitro-benzene;
2-methyl-5-methoxy-1,4-diamino-benzene;
2,5-diethoxy-1,4-diamino-benzene;
1,3-diamino-benzene;
2,3,5,6-tetrachloro-1,4-diamino-benzene;
2,4,5,6-tetrachloro-1,3-diamino-benzene;
4,4'-diamino-diphenyl;
2,2'-dichloro-4,4'-diamino-diphenyl;
3,3'-dichloro-4,4'-diamino-diphenyl;
3,3'-dimethoxy-4,4'-diamino-diphenyl;
2-nitro-4,4'-diamino-diphenyl;
3,3'-diethoxy-4,4'-diamino-diphenyl;
3-methyl-4,4'-diamino-diphenyl;
3,3'-dimethyl-4,4'-diamino-diphenyl;
3,3'-dimethyl-4,4'-diamino-6,6'-dinitro-diphenyl;
2,2'-dimethyl-4,4'-diamino-diphenyl;
2,2'-dichloro-4,4'-diamino-5,5'-dimethoxy-diphenyl;
2,2',5,5'-tetrachloro-4,4'-diamino-diphenyl;
3,3',5,5'-tetrachloro-4,4'-diamino-diphenyl;
3,3',5,5'-tetramethyl-4,4'-diamino-diphenyl;
perchloro-4,4'-diamino-diphenyl;
4,4'-diamino-diphenyl-ether;
4,4'-diamino-diphenylsulphone;
3,3'-diamino-4,4'-dichloro-diphenylsulphone;
3,3'-diamino-4,4'-dimethoxy-diphenylsulphone;
4,4'-diamino-diphenylketone;
3,3'-diamino-diphenylketone;
3,3'-diamino-4,4'-dichloro-diphenylketone;
3,3'-diamino-4,4'-dimethoxy-diphenylketone;
4,4'-diamino-diphenylmethane;
3,3'-diamino-diphenylmethane;
4,4'-diamino-3,3',5,5'-tetrachloro-diphenylmethane;
4,4'-diamino-stilbene;
4,4'-diamino-benzanilide;
4,4'-diamino-diphenyl-ethane (sym.);
4,4'-diamino-azobenzene;
2,8-diamino-chrysene;
1,4-diamino-naphthalene;
1,5-diamino-naphthalene;
2,6-diamino-naphthalene;
2,7-diamino-naphthalene;
2-(4'-amino-phenyl)-5-amino-benzotriazole;
2,5-bis(4'-amino-phenyl)-oxdiazole;
4,4'-diamino-diphenyl urea;
4,4'-diamino-3,3'-dimethoxy-stilbene;
2,6-diamino-benzothiazole;
2-(4'-aminophenyl)-6-amino-benzothiazole;
2,7-diamino-fluorene;
2,7-diamino-diphnylene-oxide;
2,7-diamino-diphenylene-sulphone;
2,5-bis(4'-amino-phenyl)-thiadiazole;
2,5-bis(4'-aminophenyl)-triazole.

The following solvents boiling above 80° C. may be mentioned, by way of example, for the condensation of the monoazo dyestuffs (II) or (IIa) with the diamines (III) in high-boiling organic solvents: benzene, toluene, xylenes, chlorobenzene, o-, m-, p-dichlorobenzene, trichlorobenzenes, nitrobenzene, quinoline, glacial acetic acid, cyclohexane, 1,2,3,4-tetrahydro-naphthalene, naphthalene, tetrachloroethylene, di-n-butyl ether, anisole, diphenyl ether, decalin and mixtures of such solvents.

Suitable acidic condensation agents are, for example, acetic acid, propionic acid, anhydrous sodium acetate, zinc chloride, ferric chloride, aluminium chloride, hydrochloric aicd, sulphuric aid, oxalic acid, formic acid, boron trifluoride and orthophosphoric acid.

Symmetrical and asymmetrical dyestuffs of the Formula I can be synthetised, dependent upon the choice of the component (II).

The products obtained according to the present process are hardly soluble to insoluble in water. They are valuable pigment dyestuffs the shades of which are in the greenish yellow to yellow range. The pigments are usually obtained in crystalline form. They are characterised by a good colour strength, very good thermal stability, and by fastness to solvents, light, lacquer coating and migration and are therefore used for the colouring of plastics, e.g. of polyvinyl chloride containing plasticisers, of lacquers and papers, and for the production of printing inks and pigment pastes.

Because of their excellent thermal stability, the products are especially suitable for colouring copolymers and grafted polymers of acrylonitrile-butadiene-styrene. They are stable even at temperatures of 200° C. and above.

Belgian patent specification No. 652,251 already mentions pigment dyestuffs of the general formula

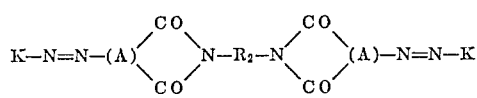

in which K is defined as the radical of any coupling component, A as an aromatic or heterocyclic system and R₂ as a bivalent alkyl, aryl, aralkyl or hetero radical. However, this patent specification does not contain a single example of a dyestuff of the general formula there stated, and not even an example of one of the components K, A and R₂. The patent specification otherwise contains only a few, very general data regarding processes for the production of the pigment dyestuffs.

The following examples are given for the purpose of illustrating the invention; the parts are parts by weight and the temperatures are given in degrees Centigrade.

EXAMPLE 1

44.5 parts 3-amino-phthalic acid are suspended in 500 parts water, 250 parts ice and 80 parts concentrated hydrochloric acid are added, and the mixture is diazotised at 0–5° with a solution of 17.1 parts sodium nitrite in 50 parts water. The excess nitrite is removed by means of amidosulphonic acid.

43 parts 1-phenyl-3-methyl-pyrazolone-(5) are suspended in 200 parts ethanol, 400 parts of a 10% sodium hydroxide solution are added, 250 g. ice are thrown into the mixture and the above diazo suspension is then introduced at 5–15°. When the coupling is completed, the reaction mixture is acidified with semi-concentrated hydrochloric acid, the product is filtered off with suction, washed with water until free from acid, and dried in a drying cabinet at 80°. The yield is 85 parts azo dyestuff.

For conversion into the anhydride, these 85 parts azo dyestuff are heated with 500 parts chlorobenzene and 50 parts acetic anhydride at about 110° for 3–4 hours, the reaction mixture is cooled to room temperature, the product is filtered off with suction, washed with light petrol and dried. 80 parts monoazo-o-dicarboxylic anhydride are thus obtained, M.P. 286–288°.

7.20 parts of the anhydride and 1.08 parts 1,4-diaminobenzene are heated in a solution of 25 parts glacial acetic acid and 500 parts o-dichlorobenzene at 130–140° for 25 hours. The pigment is filtered off with suction at 60–70°, washed with 100 ml o-dichloro-benzene and then dried in a vacuum at 80° until the weight is constant. This method yields 7.20 parts of a yellow pigment dyestuff of the formula

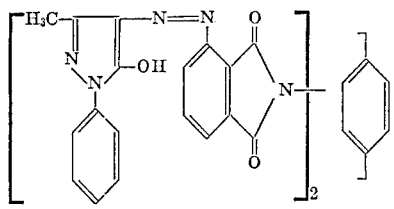

EXAMPLE 2

44.5 parts 3-amino-phthalic acid are diazotised as in Example 1.

70 parts 1-(3′ - nitrophenyl)-3-methyl-pyrazolone - (5) are suspended in 200 parts ethanol, 400 parts of a 10% sodium hydroxide solution are added, 250 parts ice are thrown into the mixture, and coupling is then carried out at 5–10° by adding the diazo suspension of 3-amino-phthalic acid in portions. When the coupling is completed, the reaction mixture is adjusted to pH 1–2 by means of semi-concentrated hydrochloric acid and the azo dyestuff is filtered off with suction. It is washed with water until free from acid and dried at 80°. The yield is 98 parts dyestuff which is converted into the dicarboxylic anhydride by heating it for 3–4 hours in 500 parts chlorobenzene with 50 parts acetic anhydride. Yield of anhydride; 82 parts; M.P. 305°.

8.3 parts monoazo-o-dicarboxylic acid are heated in 500 parts o-dichloro-benzene with 25 parts acetic acid at 120° for 4 hours. 2.53 parts 2,2′-dichloro-4,4′-diaminodiphenyl are then added and heating is continued at 130–140° for 25 hours. The reaction mixture is subsequently cooled to 60–70°, the precipitated pigment is filtered off with suction, washed with 100 parts warm o-dichlorobenzene and dried in a vacuum at 80° until the weight is constant. 9.5 parts of a yellow pigment dyestuff are thus obtained, which has very good fastness to light and lacquer coating and corresponds to the following formula:

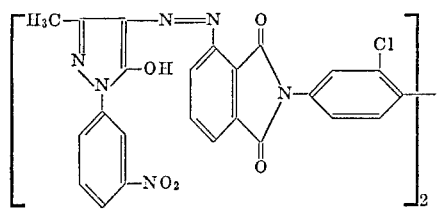

EXAMPLE 3

44.5 parts 3-amino-phthalic acid are diazotised as in Example 1.

50 parts 1-(4′-methylphenyl)-3-methyl-pyrazolone-(5) are suspended in 200 parts ethanol, a solution of 40 parts caustic soda in 60 parts water is added, followed by the addition of 200 parts ice, and the diazo suspension is then introduced in portions at 5–10°.

When the coupling is completed, the reaction mixture is acidified with semi-concentrated hydrochloric acid, the dyestuff is filtered off with suction, washed with water until free from acid, and dried in a drying cabinet at 80°. The dyestuff yield is 94 parts. By heating the product in 600 parts chlorobenzene with 60 parts acetic anhydride for 4 hours, filtering off with suction and drying, there are obtained 84 parts of the dyestuff dicarboxylic anhydride of melting point 294–295°.

7.4 parts of this monoazo-o-dicarboxylic anhydride are suspended in a solution of 500 parts o-dichloro-benzene and 50 parts acetic acid, 1.16 parts hexamethylene-diamine are added and the reaction mixture is heated at 130–140° for 25 hours. The pigment is filtered off with suction at 50° and dried in a vacuum at 80°. There are thus obtained 7.1 parts of a yellow pigment dyestuff of very good fastness properties and the following formula

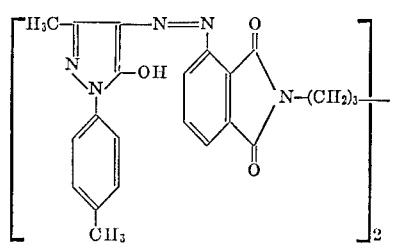

Very valuable yellow pigment dyestuffs are also obtained, when the procedure described in Examples 1–3 is followed, but with the difference that, instead of the diazo component, coupling components and diamines there

| Diazo component | Coupling component | Diamine |
| --- | --- | --- |
| 3-amino-phthalic acid | 1-phenyl-3-methyl-pyrazolone-(5) | 1,4-diamino-butane. |
| Do | do | 1,6-diamino-hexane. |
| Do | do | 1,4-di-(aminomethyl)-benzene. |
| Do | do | 4,4'-diamino-diphenyl. |
| Do | do | 4,4'-diamino-diphenyl ether. |
| Do | do | 3,3'-diamino-di-n-propyl ether. |
| Do | do | 2,2'-dichloro-4,4'-diamino-diphenyl. |
| Do | 1-(4'-methylphenyl)-3-methyl-pyrazolone-(5) | 1,4-diamino-butane. |
| Do | do | 1,4-di-(aminomethyl)-benzene. |
| Do | do | 1,4-diamino-benzene. |
| Do | do | 4,4'-diamino-diphenyl. |
| Do | do | 2,2'-dichloro-4,4'-diamino-diphenyl. |
| Do | do | 3,3'-dichloro-4,4'-diamino-diphenyl. |
| Do | 1-(3'-nitrophenyl)-3-methyl-pyrazolone-(5) | 1,2-diamino-ethane. |
| Do | do | 1,4-diamino-butane. |
| Do | do | 1,6-diamino-hexane. |
| Do | do | 4,4'-diamino-diphenylmethane. |
| Do | do | 1,4-diamino-benzene. |
| Do | do | 1,4-diamino-2-chloro-benzene. |
| Do | do | 3,3'-diamino-di-n-propyl ether. |
| Do | 1-phenyl-3-carbethoxy-pyrazolone-(5) | 1,2-diamino-ethane. |
| Do | do | 1,4-diamino-butane. |
| Do | do | 1,6-diamino-hexane. |
| Do | do | 3,3'-diamino-di-n-propyl ether. |
| Do | do | 1,4-diamino-benzene. |
| Do | do | 1,4-di-(aminomethyl)-benzene. |
| Do | 1-(4'-chlorophenyl)-3-carbethoxy-pyrazolone-(5) | 1,2-diamino-ethane, 1,4-diamino-butane. |
| Do | do | 1,6-diamino-hexane. |
| Do | do | 1,4-diamino-benzene. |
| Do | do | 4,4'-diamino-diphenyl. |
| Do | do | 3,3'-dimethyl-4,4'-diamino-diphenyl. |
| Do | do | 4,4'-diamino-diphenyl ether. |
| Do | 1-(3'-sulphonamidophenyl)-3-methyl-pyrazolone-(5) | 1,2-diamino-ethane. |
| Do | do | 1,6-diamino-hexane. |
| Do | do | 1,4-diamino-benzene. |
| Do | do | 4,4'-diamino-diphenyl. |
| Do | do | 1,4-diamino-naphthalene. |
| Do | do | 2,7-diamino-naphthalene. |
| Do | 1-(3'-chlorophenyl)-3-methyl-pyrazolone-(5) | 1,2-diamino-ethane. |
| Do | do | 1,4-diamino-benzene. |
| Do | do | 1,6-diamino-hexane. |
| Do | do | 2,2'-dichloro-4,4'-diamino-diphenyl. |
| Do | do | 4,4'-diamino-diphenyl ether. |
| Do | do | 4,4'-diamino-stilbene. |
| Do | 1-phenyl-3-carbonamido-pyrazolone-(5) | 1,4-diamino-benzene. |
| Do | do | 4,4'-diamino-diphenyl. |
| Do | do | 1,2-diamino-ethane. |
| Do | 1-phenyl-3-carbomethoxy-pyrazolone-(5) | 1,4-diamino-benzene. |
| Do | do | 4,4'-diamino-diphenyl. |
| Do | do | 1,2-diamino-ethane. |
| 3-amino-4,5-dichloro-phthalic acid | 1-phenyl-3-methyl-pyrazolone-(5) | 1,4-diamino-benzene. |
| Do | do | 4,4'-diamino-diphenyl. |
| Do | do | 1,2-diamino-ethane. |
| 3-amino-6-methyl-phthalic acid | do | 1,4-diamino-benzene. |
| Do | do | 4,4'-diamino-diphenyl. |
| Do | do | 1,2-diamino-ethane. |
| 3-amino-6-methoxy-phthalic acid | do | 1,4-diamino-benzene. |
| Do | do | 4,4'-diamino-diphenyl. |
| Do | do | 1,2-diamino-ethane. |
| 3-amino-4-chloro-phthalic acid | do | 1,2-diamino-benzene. |
| Do | do | 4,4'-diamino-diphenyl. |
| Do | do | 1,2-diamino-ethane. |
| Do | do | 4,4'-diamino-benzanilide. |
| 3-amino-phthalic acid | 1-(2'-chlorophenyl)-3-methyl-pyrazolone-(5) | 1,2-diamino-ethane. |
| Do | do | 4,4'-diamino-diphenyl. |
| Do | do | 4,4'-diamino-benzanilide. |
| Do | do | 4,4'-diamino-diphenyl-urea. |
| Do | do | 4,4'-diamino-diphenylsulfone. |

EXAMPLE 4

7.9 parts of the dicarboxylic anhydride of the dyestuff from diazotized 3-amino-phthalic acid and 1-(2'-chlorophenyl)-3-methyl-pyrazolone-(5) and 1.08 parts of 1,4-diamino-benzene are refluxed for 6 hours in a mixture of 250 parts of chlorobenzene and 25 parts of glacial acetic acid. The reaction mixture is subsequently cooled to 70° and the precipitated pigment is filtered off with suction, washed 5 times with chloro-benzene and dried in a vacuum at 80° until the weight is constant. 8.1 parts of a greenish yellow pigment are thus obtained, which has a very good fastness to light.

EXAMPLE 5

8.9 parts of the monoazo dyestuff of diazotized 3-amino-6-chlorophthalic acid and 1-(2'-chlorophenyl)-3-methyl-pyrazolone-(5) are heated for 2 hours at 120° in a mixture of 250 parts o-dichloro-benzene and 25 parts glacial acetic acid. 2.27 parts 4,4'-diamino-benzanilide are added and heating is continued for 6 hours. The precipitated pigment is filtered off with suction at 60°, washed with warm o-dichlorobenzene and dried. 9.8 parts of pigment dyestuff are thus obtained.

EXAMPLE 6

7.20 parts of the anhydride of the azo dyestuff of 3-aminophthalic acid and 1-phenyl-3-methyl-pyrazolone-(5) (or 7.5 parts of the corresponding dicarboxylic acid) and 0.6 parts of 1,2-diamino-ethane are heated for 8 hours at 120° in a mixture of 250 parts nitrobenzene and 50 parts propionic acid. The precipitated pigment is filtered off with suction at 60 to 70°, washed with warm nitrobenzene and dried in a vacuum until the weight is constant. 6.65 parts of a reddish yellow pigment are thus obtained, which has a very good fastness to light and lacquer coating.

What we claim is:

1. Azo dyestuffs which are free from sulphonic acid groups and which correspond to the formula:

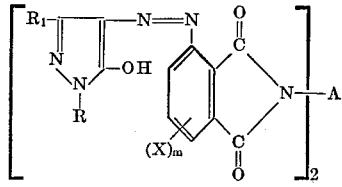

in which R is selected from the class consisting of lower alkyl, phenyl, naphthyl radicals, substituted lower alkyl, substituted phenyl and substituted naphthyl radicals wherein the substituents are methyl, chloro, methoxy, nitro, or sulphonamido; $R_1$ is selected from the group consisting of hydrogen, lower alkyl, carboxylic acid methyl ester, carboxylic acid ethyl ester, carboxylic acid amide, carboxylic acid anilide; X is selected from the group consisting of lower alkyl, chloro, fluoro, bromo, nitro, lower alkoxy, methyl sulphonyl, ethyl sulphonyl, trifluoromethyl, phenyl sulphonyl, and carbo-lower alkoxy; wherein $m$ stands for an integer from 0 to 3; and A is selected from the class consisting of divalent aliphatic, araliphatic, or carbocyclic hydrocarbon radicals, hetero-atom containing radicals having the formulae:

—H₂C—CH₂—CH₂—O—CH₂—CH₂—CH₂—

—CH₂—CH₂—CH₂—S—CH₂—CH₂—CH₂—

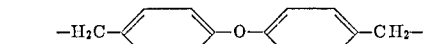

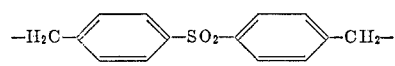

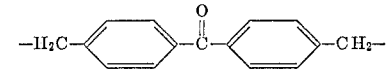

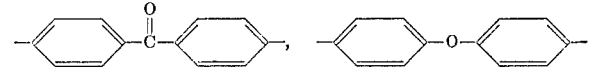

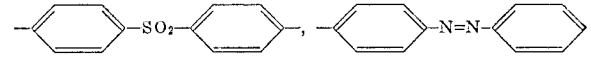

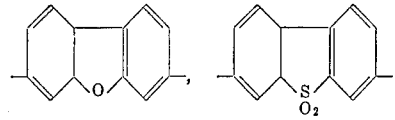

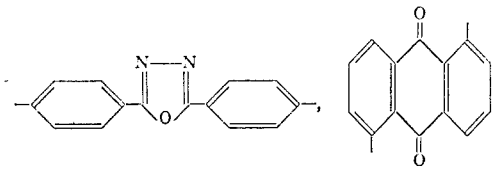

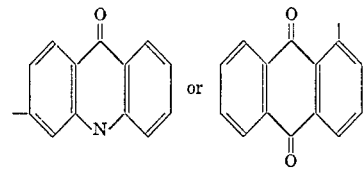

heterocyclic radicals having the formulae:

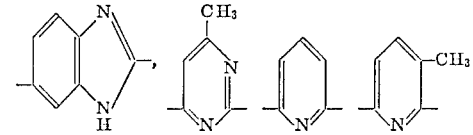

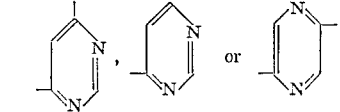

and substituted radicals of said aliphatic, araliphatic, carbocyclic, hetero-atom containing and heterocyclic radicals wherein the substituents are nitro, chloro, methoxy or ethoxy.

2. Azo dyestuffs which are free from sulphonic acid groups and which correspond to the formula:

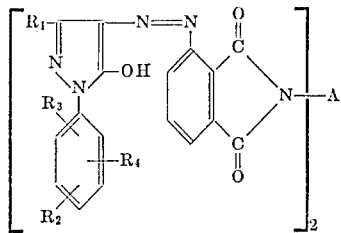

in which $R_1$ is selected from the class consisting of methyl, carbomethoxy, and carbethoxy; $R_2$ is selected from the class consisting of hydrogen, methyl, fluoro, nitro, methoxy, ethoxy and sulphonamido; $R_3$ is selected from the group consisting of hydrogen, methyl, chloro and methoxy; $R_4$ is selected from the group consisting of hydrogen and fluoro; and A stands for a radical selected from the group consisting of divalent aliphatic, araliphatic, carbocyclic hydrocarbon radicals, hetero-atom containing radicals having the formulae:

—H₂C—CH₂—CH₂—O—CH₂—CH₂—CH₂—

—CH₂—CH₂—CH₂—S—CH₂—CH₂—CH₂—

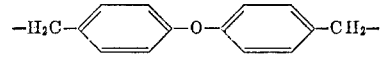

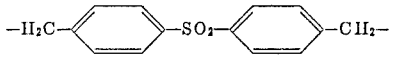

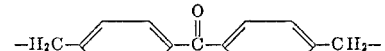

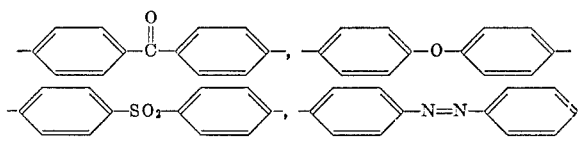

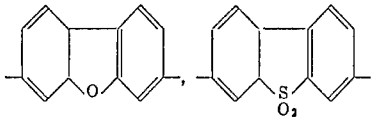

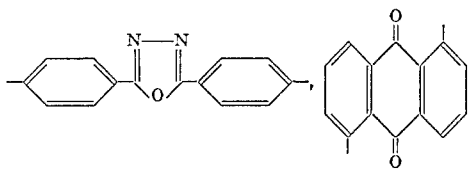

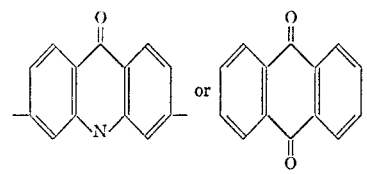

heterocyclic radicals having the formulae:

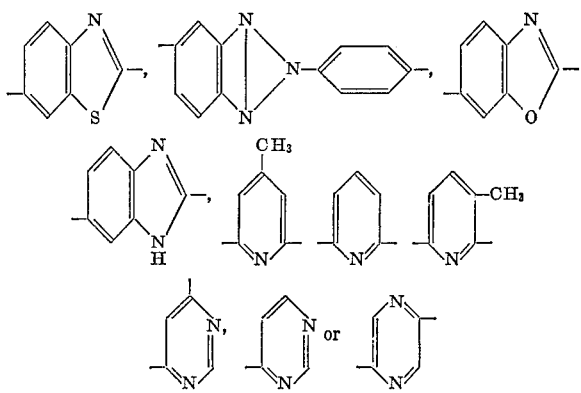

and substituted radicals of said aliphatic, araliphatic, carbocyclic, hetero-atom containing and heterocyclic radicals wherein the substituents are nitro, chloro, methoxy or ethoxy.

3. Azo dyestuffs of claim 2 wherein A is a lower alkylene group, a phenylene group, a diphenyl group, a substituted phenyl group or substituted diphenyl group, the substituents being methyl, nitro, chloro, methoxy, or ethoxy.

4. The azo dyestuff of the formula

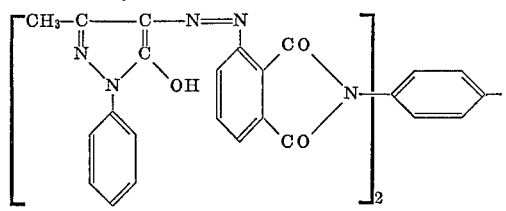

5. The azo dyestuff of the formula

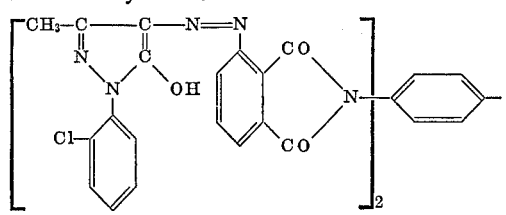

6. The azo dyestuff of the formula

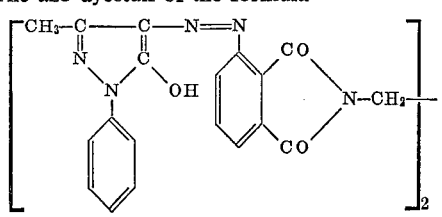

7. The azo dyestuff of the formula

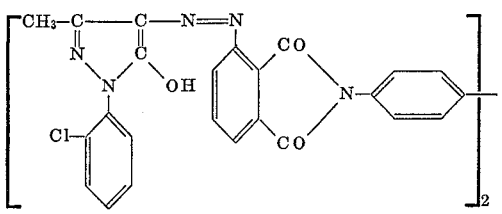

8. The azo dyestuff of the formula

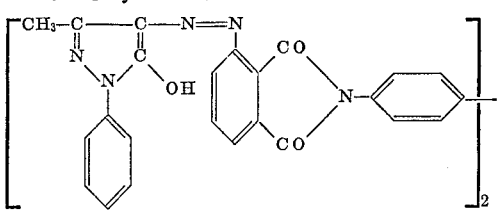

9. The azo dyestuff of the formula

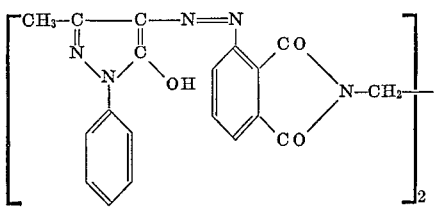

10. The azo dyestuff of the formula

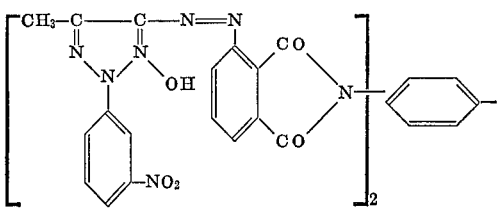

References Cited

FOREIGN PATENTS 652,251  12/1964  Belgium.

CHARLES B. PARKER, Primary Examiner

D. M. PAPUGA, Assistant Examiner

U.S. Cl. X.R.

106—22, 288; 117—154; 260—154, 156, 158, 163, 310, 37

UNITED STATES PATENT OFFICE
CERTIFICATE OF CORRECTION

Patent No. 3,467,643                                September 16, 1969

Walter Horstmann et al.

It is certified that error appears in the above identified patent and that said Letters Patent are hereby corrected as shown below:

Column 1, line 45, formula, the single bond connecting $(X)_m$ to the first structure left-hand side is missing. Column 2, line 10, "$-CH_2-(CH_2)_4-CH_2$" should read -- $-CH_2-(CH_2)_4-CH_2-$ --; lines to 30 should read

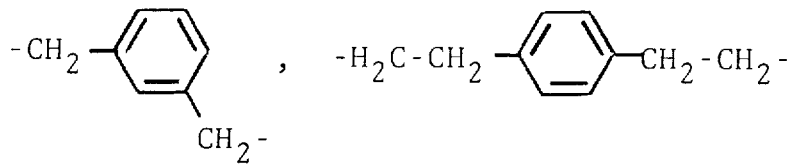

same column 2, lines 60 to 70, open valences are missing in the following formulae and should read as follows:

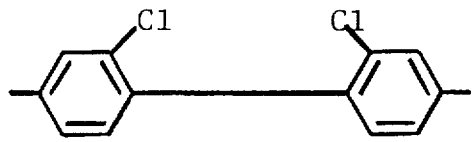

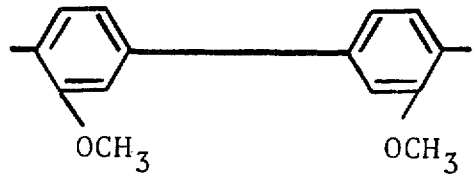

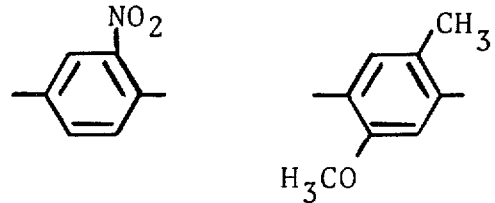

Column 3, lines 5 to 40, open valences are missing in the following formulas and should read as follows:

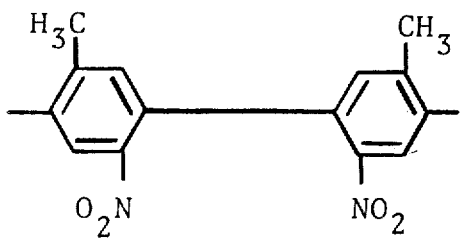

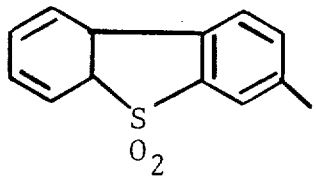

same column 3, lines 55 to 65, open valences are missing in the following formulas and should read as follows:

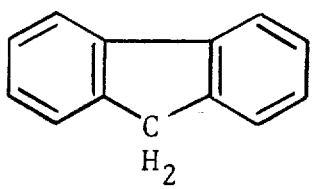 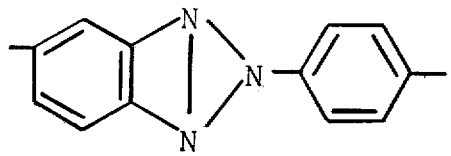

Column 6, line 42, "2,7-diamino-diphnylene-oxide" should read -- 2,7-diamino-diphenylene-oxide --; line 58, "aicd" should read -- acid --; "aid" should read -- acid --. Column 11, claim 1, line 55, open valences are missing in the following formulas and should read as follows:

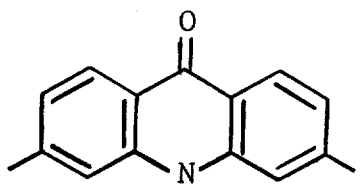 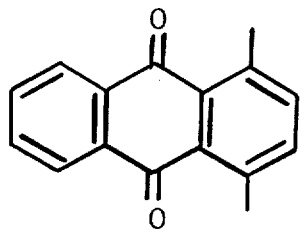

Column 12, claim 2, lines 70 to 75, open valences are missing and the following formula should read as follows:

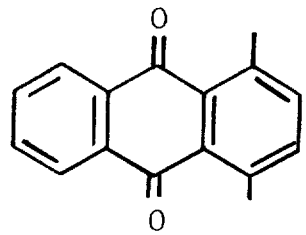

Column 13, claim 2, line 15 should be changed from

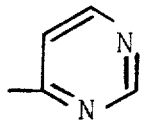　　to　　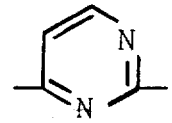

Column 14, claim 9, line 30, the ortho chloro substituent is missing in the phenyl radical. Column 3, line 45, column 11, line 55, and column 12, line 70, the radical

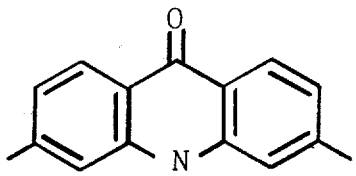　　should read　　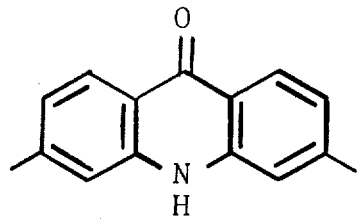

Signed and sealed this 13th day of October 1970.

(SEAL)
Attest:

EDWARD M. FLETCHER, JR.
Attesting Officer

WILLIAM E. SCHUYLER, JR.
Commissioner of Patents